United States Patent [19]

Bryant et al.

[11] Patent Number: 4,621,168

[45] Date of Patent: Nov. 4, 1986

[54] SUBMARINE CABLE JOINT HOUSING

[75] Inventors: Michael J. Bryant, Chislehurst; Stephen J. Jones, Orpington, both of England

[73] Assignee: Standard Telephones and Cables Public Limited Company, London, England

[21] Appl. No.: 697,206

[22] Filed: Feb. 1, 1985

[30] Foreign Application Priority Data

Feb. 2, 1984 [GB] United Kingdom ............... 8402728

[51] Int. Cl.[4] ........................................... H02G 15/18
[52] U.S. Cl. .................................. 174/88 C; 156/48; 156/49; 174/76; 174/84 R
[58] Field of Search .................... 174/76, 84 R, 88 R, 174/88 C, DIG. 8; 156/48, 49

[56] References Cited

U.S. PATENT DOCUMENTS

| 2,967,795 | 1/1961 | Bollmeier et al. ............... 174/76 |
| 3,781,461 | 12/1973 | Thompson et al. ............. 174/76 X |
| 4,038,490 | 7/1977 | Miller et al. ..................... 174/88 C |
| 4,079,189 | 3/1978 | Troccoli ......................... 174/88 C X |
| 4,403,110 | 9/1983 | Morrisette ....................... 174/76 X |
| 4,426,413 | 1/1984 | Fentress ..................... 174/DIG. 8 X |
| 4,433,206 | 2/1984 | Lewis ............................... 174/76 X |
| 4,484,024 | 11/1984 | Bentley, Jr. .................. 174/84 R X |
| 4,489,217 | 12/1984 | Klopfer ..................... 174/DIG. 8 X |

FOREIGN PATENT DOCUMENTS

| 1054528 | 4/1959 | Fed. Rep. of Germany ........ 174/76 |
| 1223745 | 6/1960 | France ................................... 156/49 |
| 848721 | 9/1960 | United Kingdom ................. 174/76 |
| 2059691 | 4/1981 | United Kingdom ................. 174/93 |

Primary Examiner—Arthur T. Grimley
Assistant Examiner—Morris H. Nimmo
Attorney, Agent, or Firm—Kerkam, Stowell, Kondracki & Clarke

[57] ABSTRACT

An armored submarine cable joint comprising a tubular housing with internally tapered end portions closely fitting the outer sheath of the submarine cable wherein the armoring wires or tapes adjacent each cable end are splayed and deformed within each tapered end portion. The housing is fabricated from glass filament wound epoxy resin material. The completed joint is potted with a filled epoxy resin system.

1 Claim, 2 Drawing Figures

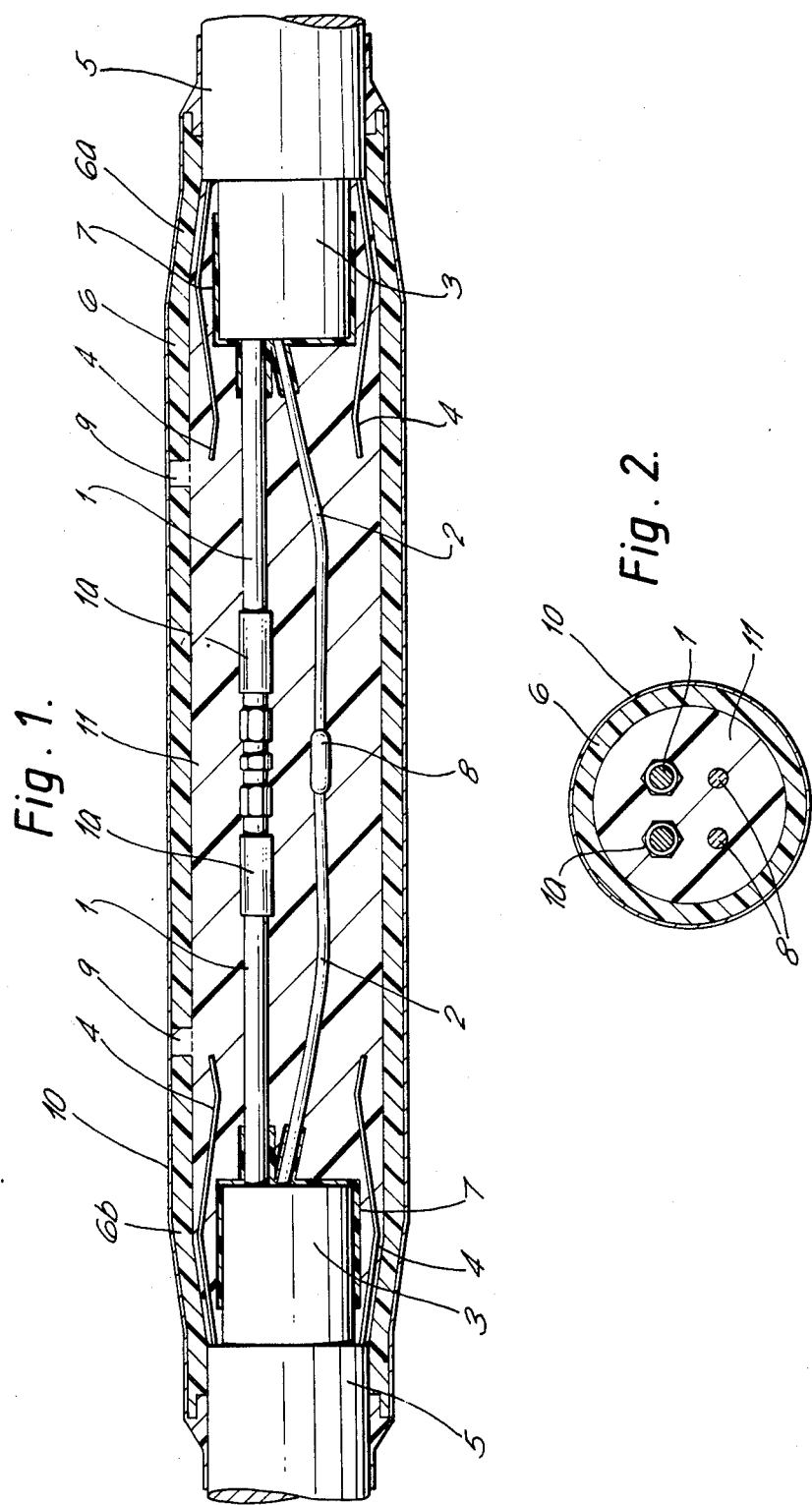

SUBMARINE CABLE JOINT HOUSING

BACKGROUND OF THE INVENTION

(1) Field of the Invention

This invention relates to a housing assembly for submarine cable joints.

The term "cable" is used hereinafter to include electrical cables, fibre optic cables, hose bundles or any combinations thereof. For example a single cable may include hoses carrying hydraulic fluids, insulated metallic conductors for electric power requirements, and metallic conductors or optical fibres for communication purposes. The cable also includes external armouring wires or tapes.

Such cables, and particularly joints in such cables, are required to withstand considerable longitudinal stresses when being laid in open sea conditions, or being lowered drom oil rigs, whilst at the same time they must resist very high compressive forces when in situ at great depths.

(2) Description of Related Art

Traditionally housings for submarine cable joints have been fabricated from machined steel tubes which incorporate (if required) steel armour anchorages, adjustable load collars, threaded end caps, and are filled with filling compound after the joint has been made and the housing secured in place. The tensile load on the joint is transferred from the armouring via the load collars to the steel casing. The filling compound serves to prevent any moisture entering the steel casing reaching the cable joints within the housing assembly. Such steel housings are expensive and heavy to handle.

SUMMARY OF THE INVENTION

According to the present invention there is provided a single section submarine cable joint housing formed as a hollow tube of filament wound epoxy resin composite, each end being internally tapered and with a central parallel section provided with a filler hole through which the completed housing is filled with a loaded epoxy resin filler compound.

The invention also provides a method of jointing an armoured submarine cable including the steps of spreading and deforming the ends of the armouring wires or tapes adjacent each cable end, enclosing the cable joint within a tubular filament wound glass epoxy resin housing having internally tapered end portions closely fitting the external covering of the cable, and filling the housing with a loaded epoxy resin compound.

BRIEF DESCRIPTION OF THE DRAWING

An embodiment of the invention will now be described with reference to the accompanying drawings wherein:

FIG. 1 depicts a longitudinal section through a submarine cable joint, and

FIG. 2 is a cross section through the joint of FIG. 1.

DESCRIPTION OF THE PREFERRED EMBODIMENTS

The cable to be joined is illustrated as a composite umbilical containing hoses 1 and electric cables 2 encased in polyethylene belting 3 which is in turn wrapped with steel armour wires 4. Finally the armouring is covered by an outer polyethylene sheath 5.

One cable end is threaded right through a filament wound glass epoxy resin housing section 6. The housing section is tubular in cross section, the main portion being of greater diameter internally than the external diameter of the cable outer sheath 5. The housing has internally tapered end portions 6a, 6b, which are a close fit over the cable outer sheaths.

The outer sheath is cut back to expose a length of armouring. The armour wires 4 are splayed out and the ends of the wires are randomly deformed, e.g. by kinking or joggling. Alternatively the wire ends may be left straight or just shot-blasted. The inner belting 3 is also cut back to a lesser extend to expose the individual hose and cable ends. Each hose end is provided with a threaded coupling 1a. Lastly, a heat shrink boot 7 may be placed over the end of the inner belting. The cable end is now ready for jointing to another cable end, similarly prepared but without having been threaded through a housing.

The two cable ends to be joined are brought together and the corresponding hose couplings 1a screwed together. Likewise the electric cable ends are joined by a suitable joint 8. The one-piece housing is then slid over the joint and centralised.

When all of the above operations have been completed the interior of the housing is potted using a filled epoxy resin system 11 via filler holes 9 in the housing section, which acts as a mould. A previously fitted heat shrinkable sleeve 10 is then moved into position over the whole joint housing and heated to form a tight shrink-fitted seal over the housing and part of the cables.

The result is a strong, lightweight cable joint that is pressure resistant and impervious to the ingress of moisture. Longitudinal tensile stress in the cable is transferred via the splayed and deformed armour wires to the epoxy resin filler within the tapered or conical end forms. The stress is transferred further to the housing section, and thence back through the filler to the armour wires of the other cable end.

The fabrication of the housing section is cheap compared with traditional steel housings. Each section is easily fabricated on a removable mandrel, the only machining then required being to the tapered extremities.

The completed joint is very stron. Typical test figures for a joint on a 94 mm diameter cable with a housing of total length 1 m show that it will withstand at least a 50 tonne tensile stress.

Whilst mention has been made of glass filament reinforcement of the epoxy resin composite, other filamentary materials are also available, e.g. Kevlar (Reg. Trade Mark), carbon fibre, polyester etc. Also the lay angle of the filament can be different at different parts of the tube to provide required tensile/hoop stress performance at different positions.

A tape or braid of stainless steel or other material, or a layer of conventional cable armour wires may be moulded if required into the joint housing to provide extra cut-resistance and mechnical protection to the joint.

We claim:

1. A submarine cable joint wherein the cables to be joined each have in their sheaths linear metallic armorings, the joint including a one-piece tubular housing of a filament-wound composite electrically insulating material, the ends of the housing are internally inwardly tapered and the housing has a central parallel section, said taper being such that the outer ends of the housing are narrower than the cross-section of the central parallel section;

the end of the housing are so dimensioned that the external coverings of the cables to be joined are each a close fit within a respective one of the said ends;

the linear metallic armourings are deformed within the housing, as by splaying, the housing is filled with a loaded resin material injected into the interior of the housing via at least one filler hole in the central parallel section of the tubular housing; and the said resin material is chosen for its compatibility with the material of the housing and for its good qualitites of resistance to compressive stress.

* * * * *